(12) United States Patent
Kardos et al.

(10) Patent No.: US 8,166,758 B2
(45) Date of Patent: May 1, 2012

(54) COOLER ARRANGEMENT AT A VEHICLE

(75) Inventors: Zoltan Kardos, Södertälje (SE);
Rickard Pettersson, Rönninge (SE);
Tomas Alsterdal, Södertälje (SE);
Henrik Nyrén, Södertälje (SE)

(73) Assignee: Scania CV AB (publ) (SE)

( * ) Notice: Subject to any disclaimer, the term of this patent is extended or adjusted under 35 U.S.C. 154(b) by 438 days.

(21) Appl. No.: 12/514,828

(22) PCT Filed: Nov. 16, 2007

(86) PCT No.: PCT/SE2007/050854
§ 371 (c)(1),
(2), (4) Date: May 26, 2009

(87) PCT Pub. No.: WO2008/066476
PCT Pub. Date: Jun. 5, 2008

(65) Prior Publication Data
US 2010/0065024 A1 Mar. 18, 2010

(30) Foreign Application Priority Data
Nov. 29, 2006 (SE) ....................... 0602547

(51) Int. Cl.
F02B 33/44 (2006.01)
F02B 47/08 (2006.01)
(52) U.S. Cl. .................. 60/605.2; 123/563; 123/568.12
(58) Field of Classification Search .................. 123/563, 123/568.12; F02B 29/00
See application file for complete search history.

(56) References Cited

U.S. PATENT DOCUMENTS 6,216,458 B1  4/2001  Alger et al.
6,244,256 B1 *  6/2001  Wall et al. ................ 123/568.12
6,367,256 B1 *  4/2002  McKee ....................... 60/605.2
6,755,158 B2 *  6/2004  Knecht et al. .............. 123/41.56
7,617,679 B2 * 11/2009  Kardos et al. ............... 60/605.2
2005/0103013 A1  5/2005  Brookshire et al.

FOREIGN PATENT DOCUMENTS

WO  WO 2006088411 A1 *  8/2006
WO  WO 2007055644 A1 *  5/2007
WO  WO 2007108761 A1 *  9/2007

OTHER PUBLICATIONS

International Search Report dated Feb. 26, 2008, issued in corresponding international application No. PCT/SE2007/050854.

* cited by examiner

Primary Examiner — Quyen Leung
Assistant Examiner — Thomas Truong
(74) Attorney, Agent, or Firm — Ostrolenk Faber LLP

(57) ABSTRACT

A cooling arrangement for a vehicle engine including at least one cooling element which has flowing through it a gaseous medium operable to being cooled by an external air flow which flows in a specified direction through the cooling element during operation of the combustion engine. A heat-supplying element is fitted at a location upstream from the cooling element with respect to the direction of the cooling air flow so that at least part of the air flowing through the heat-supplying element also flows through the cooling element. A control device is operable to activate the heat-supplying element so that the air flowing through the heat-supplying element is warmed during situations where there is risk of the gaseous medium in the cooling element being cooled to below a lowest acceptable temperature. The heat-supplying element and the cooling element have a connection so that they constitute a composite unit.

11 Claims, 2 Drawing Sheets

COOLER ARRANGEMENT AT A VEHICLE

CROSS REFERENCE TO RELATED APPLICATION

The present application is a 35 U.S.C. §§ 371 national phase conversion of PCT/SE2007/050854, filed Nov. 16, 2007, which claims priority of Swedish Application No. 0602547-2, filed Nov. 29, 2006, the disclosure of which is incorporated by reference herein. The PCT International Application was published in the English language.

BACKGROUND TO THE INVENTION, AND TECHNICAL FIELD

The present invention relates to a cooling arrangement for a vehicle for controlling the temperature of and the cooling of a gaseous medium conducted in a pathway leading to an operation of the engine.

The amount of air which can be supplied to a supercharged combustion engine depends on the pressure of the air but also on the temperature of the air. Supplying a largest possible amount of air to the combustion engine entails cooling the compressed air in a charge air cooler before it is led to the combustion engine. The compressed air is usually cooled, in a charge air cooler situated at a front portion of a vehicle, by surrounding air. The compressed air can thus be cooled to a temperature substantially corresponding to the temperature of the surroundings. In cold weather conditions the compressed air in the charge air cooler is cooled to a temperature which may be below the dewpoint temperature of the air, resulting in the precipitation of water vapour in liquid form in the charge air cooler. When the temperature of the surrounding air is below 0° C., there is also risk of the precipitated water freezing to ice within the charge air cooler. Such ice formation will cause a greater or lesser degree of obstruction of the air flow ducts within the charge air cooler, resulting in a reduced flow of air to the combustion engine and hence operational malfunctions or stoppages.

The technique known as EGR (Exhaust Gas Recirculation) is a known way of recirculating part of the exhaust gases from a combustion process in a combustion engine. The recirculating exhaust gases are mixed with the inlet air to the combustion engine before the mixture is led to the cylinders of the combustion engine. Adding exhaust gases to the air causes a lower combustion temperature resulting inter alia in a reduced content of nitrogen oxides $NO_x$ in the exhaust gases. This technique is used for both Otto engines and diesel engines. The recirculating exhaust gases are cooled in at least one EGR cooler before they are mixed with the inlet air. The use of EGR coolers in which recirculating exhaust gases are cooled by surrounding air is a known practice. The recirculating exhaust gases can thereby likewise be cooled to a temperature substantially corresponding to the temperature of the surroundings. Exhaust gases contain water vapour which condenses within the EGR cooler when they are cooled to a temperature below the dewpoint of the water vapour. In cases where the temperature of the surrounding air is below 0° C., there is also risk of the condensed water freezing to ice within the EGR cooler. Such ice formation will cause a greater or lesser degree of obstruction of the exhaust flow ducts within the EGR cooler, thereby increasing the content of nitrogen oxides in the exhaust gases.

SUMMARY OF THE INVENTION

The object of the present invention is to provide a cooling arrangement which comprises an air-cooled cooler for cooling of a gaseous medium, in which the gaseous medium is preventing from being cooled to below a lowest acceptable temperature even in circumstances where the cooling air is at a very low temperature.

This object is achieved with the cooling arrangement of the invention. A cooling arrangement for a vehicle engine including at least one cooling element which has flowing through it a gaseous medium operable to being cooled by an external air flow which flows in a specified direction through the cooling element during operation of the combustion engine. A heat-supplying element is fitted at a location upstream from the cooling element with respect to the direction of the cooling air flow so that at least part of the air flowing through the heat-supplying element also flows through the cooling element. A control device is operable to activate the heat-supplying element so that the air flowing through the heat-supplying element is warmed during situations where there is risk of the gaseous medium in the cooling element being cooled to below a lowest acceptable temperature. The heat-supplying element and the cooling element have a connection so that they constitute a composite unit.

According to the invention, the cooling arrangement thus comprises a heat-supplying element fitted at a location upstream from a cooling element with respect to the direction of the cooling air flow. In circumstances where there is risk of the medium in the cooler being cooled to below the lowest acceptable temperature, the heat-supplying element is activated so that it warms the air passing through the heat-supplying element. The cooling air flow will thus be at a higher temperature than the surroundings when it reaches the cooling element situated downstream. The air flow will with advantage be warmed to a temperature corresponding to at least the lowest acceptable temperature of the medium, thereby ensuring that the gaseous medium in the cooling element cannot be cooled to a temperature below the lowest acceptable temperature by the air flow. Gaseous media which include air contain water vapour. When such a gaseous medium is cooled to a temperature below the dewpoint of the water vapour, water in liquid form is precipitated within the cooling element. If the gaseous medium is cooled to a temperature below 0° C., the precipitated water will freeze to ice within the cooling element. The aforesaid lowest acceptable temperature of the medium refers primarily to the gaseous medium not being cooled to a temperature below 0° C. which would result in ice formation within the cooling element, but in practice a safety margin of a couple of degrees may be applicable for ensuring that ice formation does not occur in any part of the cooling element. The possibility is nevertheless not excluded that said lowest acceptable temperature may refer to other temperatures and other phenomena than ice formation, e.g. it may be desirable to prevent too much condensation in the cooling element. Providing a connection between the heat-supplying element and the cooling element makes it possible to fit them as a composite unit in a vehicle. Close fitting of the heat-supplyingelement and the cooling element is thereby facilitated, making it possible for the heat-supplying element to occupy a relatively small amount of space in the vehicle.

According to another preferred embodiment of the present invention, both the cooling element and the heat-supplying element comprise portions with tubular elements arranged at spacings which result in the presence, between mutually adjacent tubular elements, of passages through which said external air flow is intended to pass. The gaseous medium in the cooling element is thus provided with effective cooling within the tubular elements by the surrounding air. With advantage, the cooling element and the heat-supplying element are provided with heat transfer means fastened in their respective passages. Such heat transfer means result in an increased contact surface between the tubular elements and the external air and hence more effective heat exchange between the media within the tubular elements and surrounding air.

According to another preferred embodiment of the present invention, the cooling element comprises at least one passage and the heat-supplying element at least one passage, which passages are dimensioned and mutually positioned so that they together constitute a substantially straight flow passage extending through the heat-supplying element and the cooling element. If all the passages through the heat-supplying element are coordinated with correspondingly oriented passages through the cooling element, the heat-supplying element will present substantially no extra flow resistance to the air flowing through the cooling element. The cooling element's passage and the heat-supplying element's passage which together constitute said substantially straight flow passage are preferably provided with a common heat transfer means which constitutes said connection between the cooling element and the heat-supplying element. Such a heat transfer means fastened to both the cooling element and the heat-supplying element constitutes a connection which holds the cooling element and the heat-supplying element together. With advantage, all the passages of the cooling element and the heat-supplying element are provided with such common heat transfer means, resulting in a very stable connection between the cooling element and the heat-supplying element. With advantage, said heat transfer means is made of a sheet-metal type of material structured in such a way as to divide said substantially straight flow passage into a plurality of parallel flow ducts. The heat transfer means needs a structure which extends alternately between two mutually adjacent tubular elements of the cooling element and the heat-supplying element. To this end, the heat transfer means may have a zigzag structure.

According to another preferred embodiment of the present invention, said cooling element is an EGR cooler and said medium is exhaust gases which are recirculated to the combustion engine. The air which is drawn in and used in the combustion in a combustion engine contains water vapour in an amount which varies with the humidity of the surrounding air. The exhaust gases will therefore contain water vapour to a varying extent. When the exhaust gases are at a higher pressure than surrounding air, it is often difficult to prevent water vapour from condensing within an air-cooled EGR cooler. The recirculating exhaust gases should therefore not be cooled in the EGR cooler to a temperature below 0° C., since condensed water vapour in the EGR cooler would then freeze to ice. Alternatively, said cooling element may be a charge air cooler and said medium may be compressed air which is led to the combustion engine. Most diesel-powered combustion engines and many gasoline-powered combustion engines are supercharged, i.e. they comprise a turbo unit which draws in and compresses surrounding air which is led to the combustion engine. The compressed air therefore contains water vapour in an amount which varies with the humidity of the surrounding air. Since the compressed air has a higher dewpoint than air at the pressure of the surroundings, water may condense in the charge air cooler. The compressed air should therefore likewise not be cooled to a temperature below 0° C., since that might result in condensed water vapour freezing to ice within the charge air cooler.

According to another preferred embodiment of the invention, the heat-supplying element is adapted to having a heat-supplying medium flowing through it during situations where there is risk of the gaseous medium in the cooling element being cooled to below the lowest acceptable temperature. Such a medium is with advantage coolant which is used in a cooling system for cooling the combustion engine. During operation of the combustion engine, the coolant in the cooling system will normally be at a substantially constant relatively high temperature. It is therefore highly advantageous to use the coolant as a heat-supplying medium in this context. With advantage, said heat-supplying element and said cooling element are fitted in a region situated at a front portion of a vehicle. The heat-supplying element will then be at least partly situated ahead of the cooling element. In such cases the forward movement of the vehicle and the draught provided by any radiator fan fitted will create an air flow in a specified direction which first passes through the heat-supplying element before passing through the cooling element.

BRIEF DESCRIPTION OF THE DRAWINGS

A preferred embodiment of the present invention is described below by way of example with reference to the attached drawings, in which.

DETAILED DESCRIPTION OF A PREFERRED EMBODIMENT OF THE INVENTION

Figure 1:
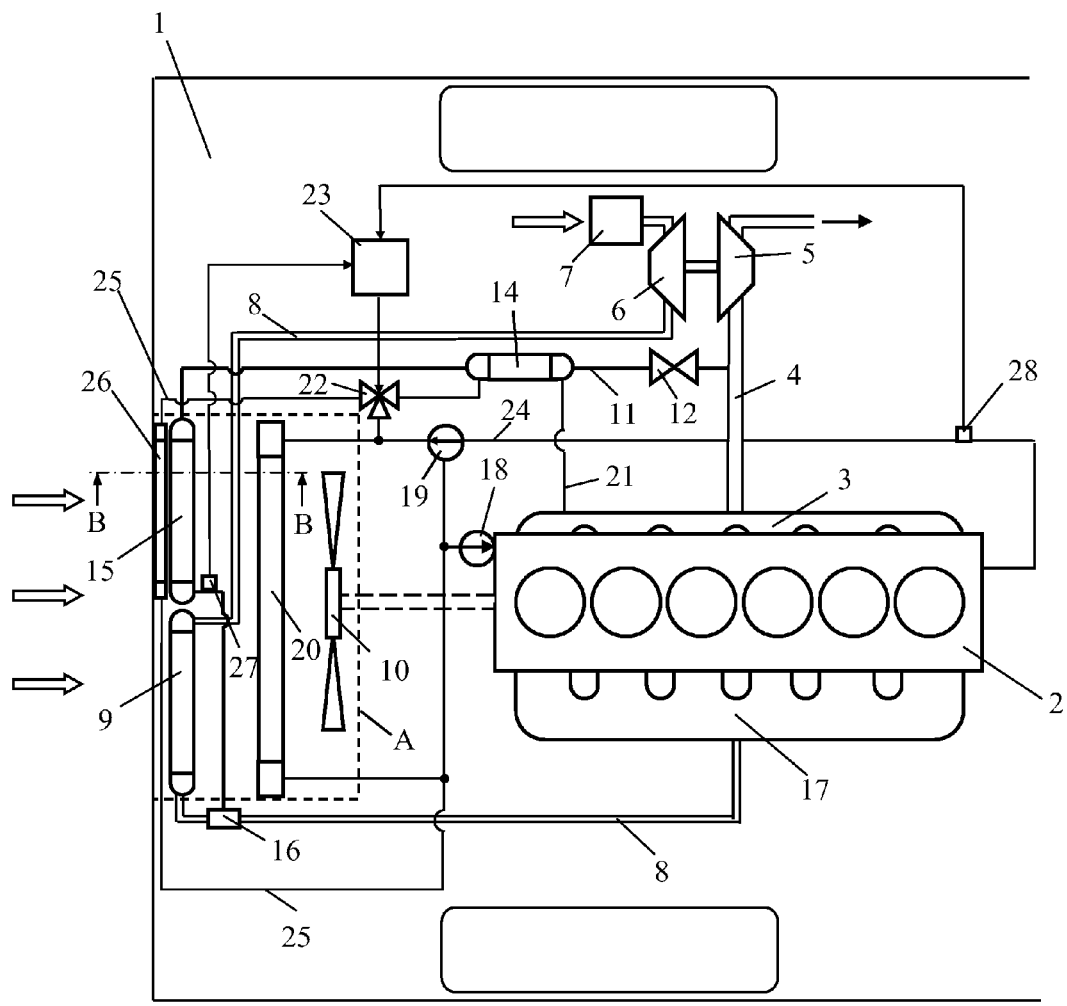
FIG. 1 depicts a cooling arrangement of a vehicle according to an embodiment of the present invention.

FIG. 1 depicts a vehicle 1 powered by a supercharged combustion engine 2. The vehicle 1 may be a heavy vehicle powered by a supercharged diesel engine. The exhaust gases from the cylinders of the combustion engine 2 are led via an exhaust manifold 3 to an exhaust line 4. The exhaust gases in the exhaust line 4, which are at above atmospheric pressure, are led to a turbine 5 of a turbo unit. The turbine 5 is thus provided with driving power which is transferred, via a connection, to a compressor 6. The compressor 6 uses this power to compress the air which is led into an inlet line 8 via an air filter 7. A charge air cooler 9 is arranged in the inlet line 8. The charge air cooler 9 is arranged in a region A at a front portion of the vehicle 1. The function of the charge air cooler 9 is to cool the compressed air before it is led to the combustion engine 2. The compressed air is cooled in the charge air cooler 9 by surrounding air which is caused to flow through the charge air cooler 9 in a specified direction by a radiator fan 10. The radiator fan 10 is driven by the combustion engine 2 via a suitable connection.

The combustion engine 2 is provided with an EGR (Exhaust Gas Recirculation) system for recirculation of exhaust gases. Adding exhaust gases to the compressed air led to the engine's cylinders lowers the combustion temperature and hence also the content of nitrogen oxides ($NO_x$) formed during the combustion processes. A return line 11 for recirculation of exhaust gases extends from the exhaust line 4 to the inlet line 8. The return line 11 comprises an EGR valve 12 by which the exhaust flow in the return line 11 can be shut off The EGR valve 12 may also be used for steplessly controlling the amount of exhaust gases led from the exhaust line 4 to the inlet line 8 via the return line 11. The return line 11 comprises a first EGR cooler 14 for subjecting the exhaust gases to a first stage of cooling, and a second EGR cooler 15 for subjecting the exhaust gases to a second stage of cooling. In supercharged diesel engines 2, in certain operating situations, the pressure of the exhaust gases in the exhaust line 4 will be lower than the pressure of the compressed air in the inlet line 8. In such situations it is not possible to mix the exhaust gases in the return line 11 directly with the compressed air in the inlet line 8 without special auxiliary means. To this end it is possible to use, for example, a venturi 16. If instead the combustion engine 2 is a supercharged Otto engine, the exhaust gases in the return line 11 can be led directly into the inlet line 8, since the exhaust gases in the exhaust line 4 of an Otto engine in substantially all operating situations will be at a higher pressure than the compressed air in the inlet line 8. When the exhaust gases have mixed with the compressed air in the inlet line 8, the mixture is led via a manifold 17 to the respective cylinders of the combustion engine 2.

The combustion engine 2 is cooled in a conventional manner by a cooling system which contains a circulating coolant. The coolant is circulated in the cooling system by a coolant pump 18. The cooling system also comprises a thermostat 19. The coolant in the cooling system is intended to be cooled in a radiator 20 fitted at a forward portion of the vehicle 1 in the region A. The radiator 20 is fitted downstream from the charge air cooler 9 and the second EGR cooler 15 with respect to the intended direction of air flow in the region A. The coolant in the cooling system is also used for subjecting the recirculating exhaust gases to a first stage of cooling in the first EGR cooler 14. The cooling system comprises a manifold in the form of a line 21 which initially leads coolant to the first EGR cooler 14 for the first stage of cooling the recirculating exhaust gases. The first EGR cooler 14 may be fitted on or close to the combustion engine 2. The recirculating exhaust gases may here be cooled from a temperature of about 500-600° C. to a temperature in the vicinity of the temperature of the coolant, which is usually within the range 70-90° C.

When the coolant has passed through the first EGR cooler 14, it is led to a valve means 22. An electrical control unit 23 in the form of a computer unit provided with suitable software 23a is adapted to placing the valve means 22 in various positions. When the control unit places the valve means 22 in a first position, the coolant is led from the first EGR cooler 14 to a line 24 in which it joins coolant coming from the combustion engine 2. The coolant is led via the line 24 to the radiator 20 in which it is cooled before being used again for cooling the combustion engine 2 or the recirculating exhaust gases in the first EGR cooler 14. When the control unit 23 places the valve means 22 in a second position, the coolant from the first EGR cooler 14 is led via a line 25 to a heat-supplying element 26. The heat-supplying element 26 is fitted ahead of the EGR cooler 15 with respect to the intended direction of the cooling air flow in the region A so that at least a major part of the air flowing through the heat-supplying element 26 also flows through the second EGR cooler 15. The heat-supplying element 26 constitutes an integral part of the EGR cooler 15 so that they can be fitted as a composite unit in the vehicle 1. For it to place the valve means 22 in a correct position, the control unit 23 receives information from a first temperature sensor 27 which detects the temperature of the recirculating exhaust gases immediately after they leave the second EGR cooler 15. The control unit 23 also receives information from a second temperature sensor 28 which detects the temperature of the coolant after it has cooled the combustion engine 2. Alternatively, the control unit 23 may receive information from a third temperature sensor which detects the temperature of the surroundings in order to control the valve means 22.

In this case, the compressed air in the charge air cooler 9 and the recirculating exhaust gases in the second EGR cooler 15 are therefore cooled by a cooling flow of surrounding air. It is thus possible to cool the compressed air and the exhaust gases to a temperature substantially corresponding to the temperature of the surroundings. The air and the exhaust gases are cooled so that they occupy a smaller specific volume, thereby making it possible to supply a larger amount of air and recirculating exhaust gases to the cylinders of the combustion engine. When the temperature of the surroundings is low, water vapour in the exhaust gases condenses in the second EGR cooler 15. If the ambient temperature is below 0° C., there is also risk of condensed water vapour freezing to ice in the second EGR cooler 15. The exhaust flow ducts in the second EGR cooler 15 may thus become obstructed. The exhaust gases should therefore not to be cooled to a temperature below 0° C.

During operation of the combustion engine 2, the control unit 23 receives information from the first temperature sensor 27 concerning the temperature of the recirculating exhaust gases after they have been cooled in the second EGR cooler 15. The control unit 23 compares the temperature values received with a reference temperature. To prevent ice formation in the second EGR cooler 15, a reference temperature of 0° C. may be used. To provide a safety margin against ice formation within the second EGR cooler 15, the control unit 23 may compare the temperature values received with a reference temperature which is somewhat higher than 0° C. So long as the control unit 23 receives information from the first temperature sensor 27 that the temperature of the recirculating exhaust gases is above the reference temperature, the control unit 23 will place the valve means in the first position, whereby the coolant circulating through the first EGR cooler 14 will be led to the cooling system's ordinary radiator 20. In this situation, no coolant will be led to the heat-supplying element 26. The cooling air flow will therefore not undergo any warming as it passes through the heat-supplying element 26 and will still be at the temperature of the surroundings when it reaches the second EGR cooler 15.

If it receives information from the first temperature sensor 27 that the recirculating exhaust gases have been cooled to a temperature below the reference temperature, the control unit 23 will place the valve means 22 in the second position, whereby the warm coolant from the first EGR cooler 14 will be led via the valve means 22 and the line 25 to the heat-supplying element 26. The air flowing through the heat-supplying element 26 will thus be warmed by the cooling air flow before it reaches the second EGR cooler 15. The cooling of the exhaust gases in the second EGR cooler 15 will thus be considerably reduced. The heat-supplying element 26 may be dimensioned to warm the cooling air flow to a temperature higher than 0° C., affording assurance that the recirculating exhaust gases in the second EGR cooler 15 will not be cooled to a temperature below 0° C. and hence totally eliminating the risk of ice formation within the second EGR cooler 15.

In certain circumstances there is risk of the cooling system being overloaded, i.e. the coolant in the cooling system being at too high a temperature. Such circumstances may for example occur when the combustion engine 2 is under heavy load at a time of high ambient temperature. If the cooling system for the combustion engine 2 is also used for cooling other components of the vehicle, e.g. a retarder, which require a large cooling capacity, the cooling system may also be overloaded when the retarder is used. In such circumstances it is possible to use an existing heat exchanger 26 as an extra cooler, thereby providing the cooling system with extra cooling capacity which will prevent overheating of the coolant. To this end, the control unit 23 may have the extra function of receiving information from the second temperature sensor 28 concerning the temperature of the coolant after it has left the combustion engine 2. The coolant in the cooling system will normally be at its highest temperature after it has cooled the combustion engine 2. The control unit 23 is adapted to comparing the temperature of the coolant with a reference temperature which the coolant should not exceed. If the temperature of the coolant exceeds the reference temperature, the control unit 23 will place the valve means 22 in the second position, whereby warm coolant will flow through the heat-supplying element 26 and be cooled therein by the cooling air flow. In this situation, the coolant in the cooling system is cooled both in the ordinary radiator 20 and in the heat-supplying element 26. The cooling system is thus provided with extra cooling capacity so that overload of the cooling system is prevented.

Figure 2:
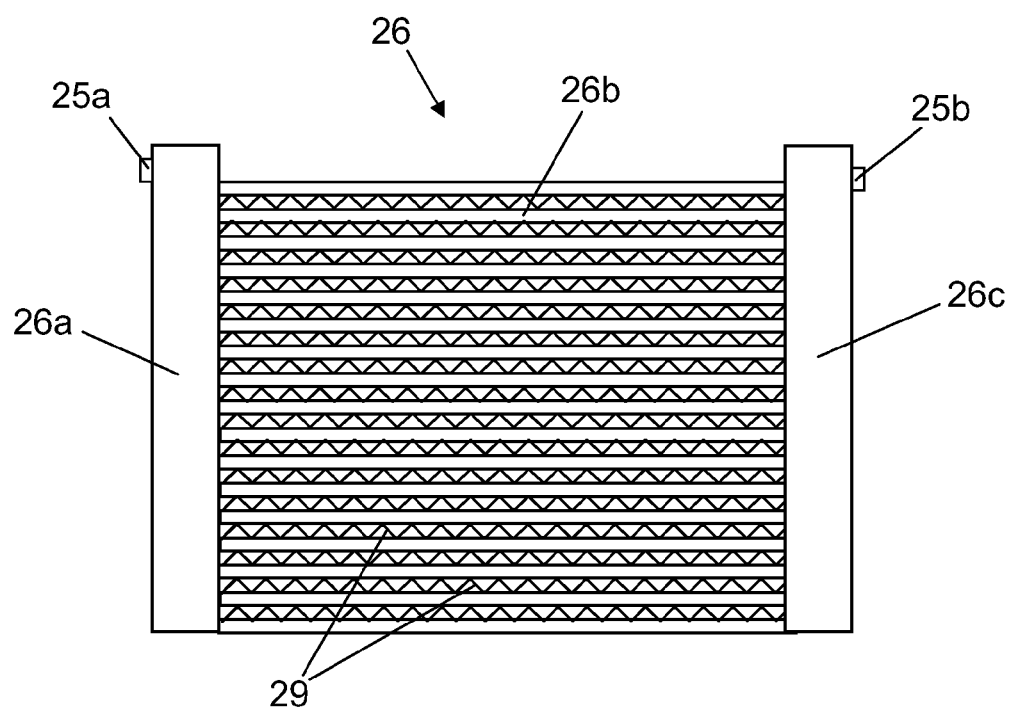
FIG. 2 depicts a front view of the heat-supplying element in FIG. 1.

FIG. 2 depicts only the heat-supplying element 26. The heat-supplying element 26 comprises a first tank 26a for receiving coolant from the line 25 via an inlet 25a. The heat-supplying element 26 further comprises a cooling portion in which the coolant is cooled by surrounding air. The cooling portion comprises in a conventional manner a plurality of substantially parallel tubular elements 26b in which the coolant is cooled by surrounding air. The cooling surrounding air is adapted to flowing through the cooling portion in passages existing between the tubular elements 26b. Heat transfer means 29 are arranged in said passages. The object of the heat transfer means 29, which are usually called "ranks", is to increase the air's contact surface with the heat-supplying element 26 so that the recirculating exhaust gases undergo more effective cooling in the tubular elements 26b. The heat transfer means 29 are usually made of a sheetmetal material with a zigzag structure. The heat transfer means 29 may therefore divide the passages between mutually adjacent tubular elements 26b into a large number of flow ducts. The heat-supplying element 26 also comprises a second tank 26c for receiving the recirculating exhaust gases after they have been cooled in the cooling portion. The recirculating exhaust gases leave the second tank 26c via an outlet 25b which is connected to the line 25.

Figure 3:
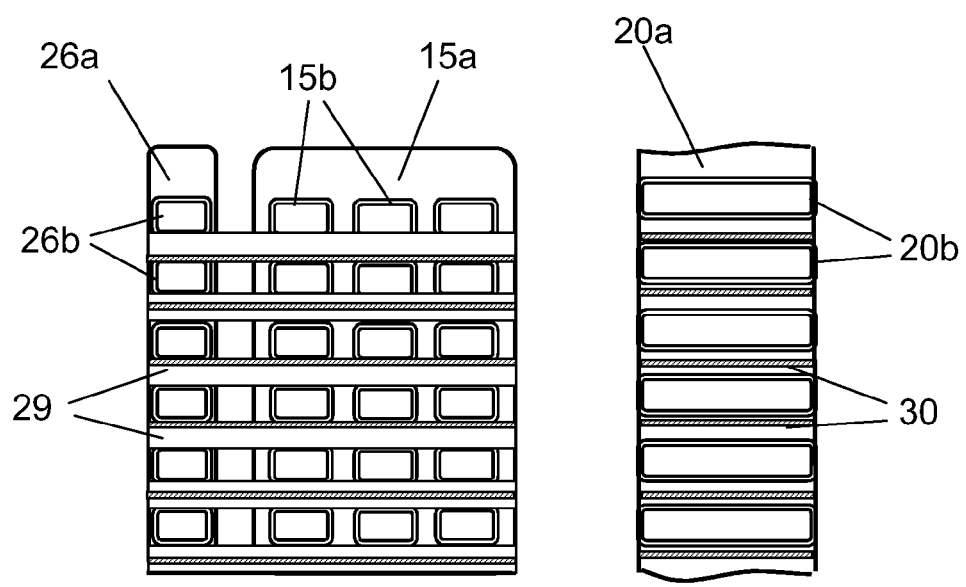
FIG. 3 depicts a section through the plane B-B in FIG. 1.

FIG. 3 depicts a section through a plane B-B in FIG. 1 which extends through the heat-supplying element 26, the second air-cooled EGR cooler 15 and the radiator 20 situated behind them. The second EGR cooler 15 and the radiator 20 are of similar construction to the heat-supplying element 26 in FIG. 2. The second EGR cooler 15 and the radiator 20 thus each have a first tank 15a, 20a for receiving recirculating exhaust gases and coolant respectively. The second EGR cooler 15 and the radiator 20 thus also each have a cooling portion with a number of substantially parallel tubular elements 15b, 20b for guiding the exhaust gases and the coolant respectively when they are being cooled by surrounding air. The second EGR cooler 15 and the radiator 20 thus each also have heat transfer means 29, 30 (ranks) arranged in the passages between the tubular elements 15b, 20b which divide the passages into a large number of flow ducts. The second EGR cooler 15 and the radiator 20 also each have a second tank (not depicted) for receiving recirculating exhaust gases and coolant respectively after they have been cooled.

The heat-supplying element 26 is provided with tubular elements 26b whose dimensions are similar to those of the tubular elements 15b of the second EGR cooler. The spacings in the height direction between mutually adjacent tubular elements in the heat-supplying element 26 are also so dimensioned that they correspond to the spacings between mutually adjacent tubular elements 15b of the second EGR cooler. The air passages of the heat-supplying element 26 and of the second EGR cooler 15 therefore coincide. Each pair of coinciding passages thus together constitute a substantially straight flow passage extending through the heat-supplying element 26 and the cooling element 15, making it possible to use common heat transfer means 29 which extend both through the passages of the heat-supplying element and through those of the EGR cooler 15. The common heat transfer means 29 are fastened both to the heat-supplying element 26 and to the second EGR cooler 15, with the result that each of the common heat transfer means 29 constitutes a connection which holds the heat-supplying element 26 and the second EGR cooler 15 together as a unit. This makes it possible for the heat-supplying element 26 and the second EGR cooler 15 to be fitted as a composite unit in a vehicle.

Since the problem of ice formation also arises in the charge air cooler 9, a corresponding heat-supplying element 26 may equally well be connected to the charge air cooler 9 so that they constitute a composite unit. The heat-supplying element 26 is applied to the side of the charge air cooler 9 which faces upstream with respect to the intended direction of air flow through the charge air cooler 9. Thus the heat-supplying element 26 can when necessary warm the air to a temperature such that no ice formation will occur in the charge air cooler 9. Here too, common heat transfer means 29 (ranks) may be used for connecting the heat-supplying element 26 to the charge air cooler 9.

The invention is in no way limited to the embodiments described but may be varied freely within the scopes of the claims.

The invention claimed is:

1. A cooling arrangement for a vehicle powered by a combustion engine, the cooling arrangement comprising:
at least one cooling element configured and operable to have flowing through it a gaseous medium, wherein the at least one cooling element is configured to cool the gaseous medium by an external air flow flowing in a specified direction through the cooling element during operation of the combustion engine;
a heat-supplying element fitted at a location upstream from the at least one cooling element with respect to the direction of the external air flow so that at least part of the air flow through the heat-supplying element flows through the cooling element;
a control device configured and operable to activate the heat-supplying element to warm the external air flow through the heat-supplying element when the control device determines a risk of the gaseous medium in the cooling element being cooled to below predetermined low threshold temperature; and
the heat-supplying element and the cooling element are connected so that they constitute a composite unit.

2. A cooler arrangement according to claim 1, wherein the cooling element comprises an EGR cooler, and the gaseous medium is in the form of exhaust gases which are recirculated to the combustion engine.

3. A cooling arrangement according to claim 1, wherein the cooling element is a charge air cooler, and the gaseous medium is compressed air which is led to the combustion engine.

4. A cooler arrangement according to claim 1, wherein the heat-supplying element is configured and operable to have a heat-supplying medium flowing through the heat-supplying element when a risk exists of the gaseous medium in the cooling element being cooled to below the predetermined low threshold temperature.

5. A cooling arrangement according to claim 1, wherein the heat-supplying element and the cooling element are fitted in a region situated at a front portion of the vehicle.

6. A cooling arrangement according to claim 1, wherein each of the cooling element and the heat-supplying element comprises a heat-transferring portion including tubular elements arranged at mutual spacings for producing passages between mutually adjacent tubular elements through which the external air flow is intended to pass.

7. A cooling arrangement according to claim 6, wherein the cooling element and the heat-supplying element are provided with heat transfer elements fastened in the respective cooling and heat supply elements in the passages between mutually adjacent tubular elements.

8. A cooling arrangement according to claim 6, wherein the cooling element comprises at least one first passage and the heat-supplying element comprises at least one second passage, the at least one first and second passages are dimensioned and mutually positioned so that they together define a substantially straight flow passage for air flow extending through the heat-supplying element and the cooling element.

9. A cooling arrangement according to claim 8, wherein the at least one first passage of the cooling element and the at least one second passage of the heat-supplying element together constitute the substantially straight flow passage; and further comprising a common transfer device comprising the connection between the cooling element and the heat-supplying element.

10. A cooling arrangement according to claim 9, wherein the cooling element and the heat-supplying element comprise heat transfer elements fastened in the respective cooling and heat supply elements in the passages.

11. A cooling arrangement according to claim 10, wherein the heat transfer elements are of sheetmetal type and are structured to divide the substantially straight flow passage into a plurality of parallel flow ducts.

\* \* \* \* \*